United States Patent Office 3,482,957
Patented Dec. 9, 1969

3,482,957
METHOD FOR SUPPRESSING THE NITRIFICATION OF AMMONIUM NITROGEN IN SOIL AND COMPOSITION THEREFOR
Kisaburo Ueno, Kamakura, Akira Hirose, Yokohama, and Tetsuichi Shinozawa, Chigasaki, Japan, assignors to Toyo Kotsu Industries Incorporated, Tokyo, Japan, a Japanese corporation
No Drawing. Filed Nov. 21, 1966, Ser. No. 595,607
Claims priority, application Japan, Nov. 26, 1965, 40/72,204; Oct. 7, 1966, 41/65,620
Int. Cl. A01n 7/00
U.S. Cl. 71—1                                10 Claims

ABSTRACT OF THE DISCLOSURE

A method for inhibiting the nitrification of ammonium nitrogen in soil and preventing rapid loss of ammonium nitrogen therefrom comprising treating the soil in a plant growing area thereof with sulfanilamide or a designated derivative thereof, which may be applied in a composition containing an ammonium fertilizer salt.

---

This invention relates to a method of suppressing the nitrification of ammonium nitrogen in soil and a fertilizer composition therefor.

Since most plants obtain the greater part or all of nitrogen requirements from the soil, it is one of the most important argricultural problems to provide nutrient nitrogen for the growth of plants in soil. Nitrogen in soil is present in the three forms of organic nitrogen, ammonium nitrogen and nitrate nitrogen. Among them, ammonium nitrogen and nitrate nitrogen are well absorbed from soil and utilized by plants.

The organic nitrogen in soil consists of various compounds and originates from manure, organic fertilizers and crop residues. Except such organic reduced nitrogen fertilizer as urea, those compounds are generally so insoluble in water as not to be readily leached from soil, but they are not directly available to the plants for use. In order to be available to the plants, the organic nitrogen must be converted to ammonia or ammonium salts by soil bacteria. Such conversion occurs very quickly in the case of such organic reduced nitrogen fertilizer as urea, but very slowly in the case of other organic nitrogen compounds. Subsequent to the conversion, ammonium nitrogen is very quickly oxidized into inorganic nitrate nitrogen by soil bacteria. Such mineralization of organic nitrogen constantly feeds soil with nitrogen which can be utilized by plants.

The ammonium nitrogen in soil is derived from bacterial conversion of organic nitrogen, or from added reduced nitrogen fertilizers such as anhydrous ammonia, aqueous ammonia, ammonium sulfate, ammonium nitrate and ammonium phosphate. These ammonium compounds dissolve readily in water or aqueous soil medium to produce ammonium ion. As soil is a kind of cation exchanger, ammonium ion is strongly adsorbed by soil and is held in soil due to the cationic nature of this ion.

The nitrate nitrogen in soil is derived from the nitrification of ammonium nitrogen by soil bacteria or from the added inorganic nitrate fertilizers such as sodium nitrate, ammonium nitrate or calcium nitrate. These nitrate compounds dissolve readily in water or aqueous soil medium to produce nitrate ion. Due to the anionic nature of this ion, nitrate ion is not adsorbed by soil. Therefore, the nitrate nitrogen is quickly leached by rainfall or irrigation and is readily lost. Further, the nitrate nitrogen is reduced to nitrogen gas by soil bacteria. (This process is known as denitrification.) The nitrate nitrogen is so easily lost from soil as described above that the rate of its utilization by plants is very low.

Thus, in order that the nitrogen in soil can be leached from the soil or lost by denitrification, it must be present as nitrate nitrogen. Therefore, in order to prevent the loss of nitrogen from soil and to improve the rate of utilization of nitrogen by plants, it is necessary to suppress the nitrification of ammonium nitrogen by soil bacteria.

An object of the present invention is to provide an improved method of preventing the loss of soil nitrogen.

Another object of the present invention is to provide an improved method of suppressing the nitrification of ammonium nitrogen in soil.

A further object of the present invention is to provide a new fertilizer composition to be employed in the method of the present invention.

The subject matter of the present invention is a method of suppressing the nitrification of ammonium nitrogen in soil comprising treating the soil in a plant growing area with 4-aminobenzenesulfonamide or a derivative thereof having the general formula

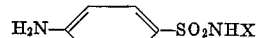

wherein X represents hydrogen,

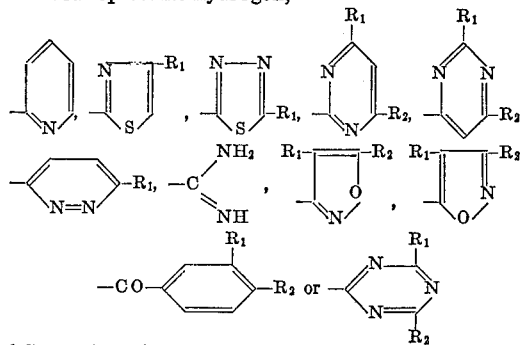

and $R_1$ and $R_2$ in
X are hydrogen, halogen, methyl or methoxy.
Examples of such compounds include
4-aminobenzenesulfonamide,
2-sulfanilamidopyridine,
2-sulfanilamidothiazole,
2-sulfanilamide-4-methylthiazole,
2-sulfanilamido-5-methyl-1,3,4-thiadiazole,
2-sulfanilamidopyrimidine,
2-sulfanilamido-4,6-dimethylpyrimidine,
6-sulfanilamido-2,4-dimethylpyrimidine,
6-sulfanilamido-2,4-dimethoxypyrimidine,
6-methoxy-3-sulfanilamidopyridazine,
sulfanilylguanidine 3,4-dimethyl-5-sulfanilamidoisoxazole
3-sulfanilamido-5-methylisoxazole,
N-sulfanilyl-3,4-xylamide and
4,6-dimethoxy-2-sulfanilamido-s-triazine.

By the method of the present invention, the conversion of ammonium nitrogen in soil to nitrate nitrogen is inhibited and ammonium nitrogen can be prevented from being quickly lost from soil. This inhibiting action lasts for more than two months. The ammonium nitrogen in such case may derive from administered fertilizer containing ammonium nitrogen, for example, ammonia or ammonium salts, or may be formed by conversion of an organic nitrogen constituent in soil or by the conversion of organic fertilizer administered to soil.

In treating soil with 4-aminobenzenesulfonamide or the derivatives thereof, it is preferable to impregnate soil below the soil surface in a plant growing area with these compounds so that the concentration of the compound in the soil is 1 to 150 parts by weight, specifically 1 to 30 parts by weight per million parts by weight of the soil. It is preferable that the amount of application of 4-aminobenzenesulfonamide or the derivatives thereof is made at least 5 grams per 1 are of the plant growing area.

4-aminobenzenesulfonamide or the derivatives thereof may be distributed on a plant growing area prior to, simultaneously with or subsequent to the administration of a nitrogen fertilizer. Further, when the soil is treated with 4-aminobenzenesulfonamide or the derivatives thereof after the harvest of crops, ammonium nitrogen produced from organic substances in the soil can be preserved for the next growing season. And it is also possible to prevent the generation of the phytotoxic nitrogen oxide gas to the atmosphere in the vinyl house or glass house by treating the plant growing area with the 4-aminobenzenesulfonamide or the derivatives thereof.

In treating a plant growing area with 4-aminobenzenesulfonamide or the derivatives thereof, 4-aminobenzenesulfonamide or the derivatives thereof may be used as mixed with a soil treating adjuvant including water, a petroleum distillates or other organic solvent, surface active agent, fine powdered inert solid and nitrogen fertilizer.

The concentration of 4-aminobenezenesulfonamide or the derivatives thereof in such composition is not critical but can be made any amount below 95% of the composition. For the inert solid carrier, talc, chalk, gypsum, vermiculite, bentonite or diatomaceous earth can be used.

A composition composed of 4-aminobenzenesulfonamide or the derivatives thereof and a fertilizer is most desirable in working the method of the present invention. Such composition is produced by dispersing 4-aminobenzenesulfonamide or the derivatives thereof in such reduced nitrogen fertilizer as ammonia, ammonium salts or urea. Further, such composition may contain a phosphate and/or potassium salt. The reduced nitrogen fertilizer may be either solid or liquid.

It is preferable that 4-aminobenzenesulfonamide or the derivatives thereof in such fertilizer composition are at least 0.5% by weight based on the weight of nitrogen present at reduced nitrogen in the fertilizer.

In dispersing 4-aminobenzenesulfonamide or the derivatives thereof in a reduced nitrogen fertilizer, these may be mechanically mixed with the fertilizer, or may be sprayed on the surface of the fertilizer in the form of organic solvent solution such as acetone solution, or may be melted together with such fertilizer of a comparatively low melting point as urea to mix 4-aminobenzenesulfonamide or the derivatives thereof with the fertilizer.

In working the method of the present invention, soil can be treated with 4-aminobenzenesulfonamide or the derivatives thereof or the compositions containing them by any convenient methods. For example, 4-aminobenzenesulfonamide or the derivatives thereof or the compositions containing them may be mechanically mixed with the soil or may be distributed on the surface of the soil; applied to the surface of soil and thereafter dragged or disced into the soil to a desired depth; transported into the soil with a liquid carrier such as by injection, spraying or irrigation. Further, the fertilizer compositions including 4-aminobenzenesulfonamide or the derivatives thereof can be administered in the same manner as of administering an ordinary fertilizer.

The following examples explain the present invention but are not construed as limiting. In the examples, the parts are by weight.

Example 1

There were prepared a mixture (I) obtained by adding 0.05 past of 4-aminobenzenesulfonamide to 33 parts of urea and uniformly mixing them, a mixture (II) obtained by adding 0.5 part of 4-aminobenzenesulfonamide to 33 parts of urea and uniformly mixing them and a mixture (III) obtained by adding 5 parts of 4-aminobenzenesulfonamie to 33 parts of urea and uniformly mixing them. 50 g. of soil were uniformly mixed with each of 33 mg. of the mixture (I), 33.5 mg. of the mixture (II) and 38 mg. of the mixture (III). Each of the resulting mixtures contained 15 mg. of nitrogen per 50 g. of the soil. The concentration of 4-aminobenzenesulfonamide in the soil was 1 p.p.m., 10 p.p.m. and 100 p.p.m. respectively. Each of said mixtures was put into a conical flask of a capacity of 100 cc. Water was added thereto so that the water content in the soil was 60% of the maximum water capacity. The flask was plugged with cotton. The contents were incubated at 280. C. for 20 days. After the completion of the incubation, the nitrogen in the soil was analyzed in respective forms. Thus the results in Table 1 were obtained.

The same experiments as were described above were carried out also on 2 - sulfanilamide - 4 - methylthiazole, 2 - sulfanilamidothiazole, 6 - sulfanilamido - 2,4 - dimethylpyrimidine, 6 - methoxy - 3 - sulfanilamidopyridazine, sulfanylylguanidine, 2 - sulfanilamidopyridine, 2 - sulfanilamido - 5 - methyl - 1,3,4 - thiadiazole, 2 - sulfanilamidopyrimidine, 3 - sulfanilamido - 5 - methylisoxazole, 3,4 - dimethyl - 5 - sulfamilamidoisoxazole, N - sulfanilyl-3,4 - xylamide and 4,6 - dimethoxy - 2 - sulfanilamido-5-triazine. The data are mean values of the duplication.

Further, for comparison, there are shown the analysis values of nitrogen in the respective forms in case soil alone and 50 g. of soil with the addition of 33 mg. of urea were incubated in the same manner as in the above described experiment.

TABLE 1

| Compounds | Forms of nitrogen | N in mg./50 g. of soil | | |
| --- | --- | --- | --- | --- |
| | | Concentration of the 4-aminobenzenesulfonamide derivative in soil | | |
| | | 1 p.p.m. | 10 p.p.m. | 100 p.p.m. |
| 4-aminobenzesulfonamide | NH$_3$-N | 9.3 | 9.8 | 10.7 |
| | NO$_3$-N | 5.2 | 4.9 | 5.0 |
| 2-sulfanilamido-4-methylthiazole | NH$_3$-N | 3.2 | 7.4 | 9.5 |
| | NO$_3$-N | 11.9 | 7.7 | 5.6 |
| 2-sulfanilamidothiazole | NH$_3$-N | 9.6 | 12.5 | 14.1 |
| | NO$_3$-N | 5.4 | 3.1 | 1.0 |
| 6-sulfanilamido-2,4-dimethyl-pyrimidine | NH$_3$-N | 6.3 | 7.7 | 10.1 |
| | NO$_3$-N | 8.9 | 8.0 | 5.1 |
| 6-methoxy-3-sulfanilamido-pyridazine | NH$_3$-N | 7.7 | 8.2 | 12.1 |
| | NO$_3$-N | 7.6 | 7.1 | 3.3 |
| Sulfanilylguanidine | NH$_3$-N | 4.3 | 11.9 | 13.3 |
| | NO$_3$-N | 10.8 | 3.6 | 2.7 |
| 2-sulfanilamidopyridine | NH$_3$-N | 3.2 | 7.4 | 9.5 |
| | NO$_3$-N | 11.9 | 7.7 | 5.6 |
| 2-sulfanilamido-5-methyl-1,3,4-thiadiazole | NH$_3$-N | 6.0 | 7.1 | 11.1 |
| | NO$_3$-N | 9.0 | 8.1 | 4.0 |
| 2-sulfanilamidopyrimidine | NH$_3$-N | 7.5 | 8.2 | 12.9 |
| | NO$_3$-N | 7.5 | 7.0 | 2.3 |
| 3,4-dimethyl-5-sulfanilamido isoxazole | NH$_3$-N | 9.6 | 11.0 | 14.0 |
| | NO$_3$-N | 5.7 | 4.4 | 0.9 |
| N-sulfanilyl-3,4-xylamide | NH$_3$-N | 4.4 | 6.9 | 7.2 |
| | NO$_3$-N | 10.7 | 8.8 | 8.1 |
| 4,6-dimethoxy-2-sulfanilamido-s-triazine | NH$_3$-N | 3.9 | 5.9 | 8.7 |
| | NO$_3$-N | 11.1 | 8.9 | 6.7 |
| 3-sulfanilamido-5-methyl isoxaole | NH$_3$-N | 3.2 | 9.0 | 13.4 |
| | NO$_3$-N | 13.0 | 6.9 | 2.7 |
| Urea alone | NH$_3$-N | 0.1 | | |
| | NO$_3$-N | 15.1 | | |
| Soil alone | NH$_3$-N | 0.2 | | |
| | NO$_3$-N | 0.3 | | |

Example 2

A dust composition was prepared by mixing 5 parts of 2-sulfanilamido-4,6-dimethylpyridine and 95 parts of talc and then grinding the resulting mixture.

Example 3

A fertilizer composition containing nitrification inhibitor was prepared by spraying 0.7 part of 4-aminobenzenesulfonamide dissolved in 10 parts of acetone onto a granular compound fertilizer containing 18% of N, 18% of $P_2O_5$ and 18% of $K_2O$ while being rolled in a rotary cylinder and then drying the resulting mixture.

Example 4

A fertilizer composition containing nitrification inhibitor was prepared by spraying 1 part of sulfanilylguanidine dissolved in 10 parts of acetone onto prilled urea and then drying the resulting mixture.

Example 5

A wettable powder was prepared by mixing 30 parts of 6-methoxy-3-sulfanilamidopyridazine, 10 parts of sodium dodecylbenzenesulfonate and 60 parts of white carbon and then grinding the resulting mixture.

This wettable powder is used as a spray after dispersion in water to give the desired concentration of active compound.

Example 6

An emulsifiable concentrate was prepared by mixing 10 parts of 2-sulfanilamidothiazole, 70 parts of xylene and Emanone 1112 (tradename) as emulsifying agent.

This emulsifiable concentrate when mixed with water in proper amounts provides an aqueous dispersion containing the desired concentration of active compound and which is employed as a spray.

In this invention, the expression "reduced nitrogen fertilizers" means fertilizers containing nitrogen in the reduced state including ammonia, ammonium salts and organic compounds readily convertible in the soil to ammonia or ammonium salts such as urea and cyanamide.

What is claimed is:

1. A method for suppressing the nitrification of additive ammonium nitrogen in soil and preventing rapid loss of ammonium nitrogen therefrom comprising impregnating soil containing an ammonium fertilizer compound, below the soil surface in the growing area thereof in concentration sufficient to suppress nitrification with a compound having the formula

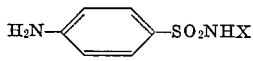

wherein X represents a member selected from the group consisting of hydrogen,

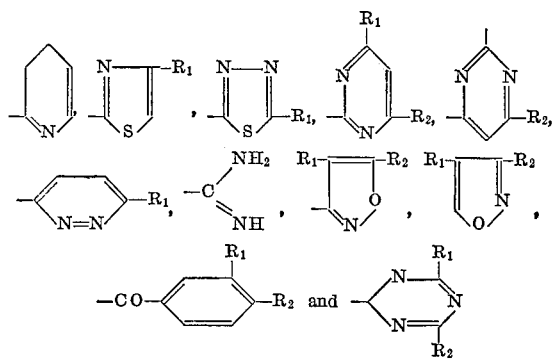

and each of $R_1$ and $R_2$ in X is a member selected from the group consisting of hydrogen, halogen, methyl and methoxy, said concentration being from about 1 to 150 parts by weight per million parts by weight of soil.

2. A method according to claim 1 wherein said compound is 4-aminobenzenesulfonamide.
3. A method according to claim 1 wherein said compound is 2-sulfanilamido-4-methylthiazole.
4. A method according to claim 1 wherein said compound is 2-sulfanilamidothiazole.
5. A method according to claim 1 wherein said compound is 6-methoxy-3-sulfanilamidopyridazine.
6. A method according to claim 1 wherein said compound is sulfanilylguanidine.
7. A method according to claim 1 wherein said compound is 2-sulfanilamidopyridine.
8. A method according to claim 1 wherein said compound is 2-sulfanilamidopyrimidine.
9. A fertilizer composition comprising a reduced nitrogen fertilizer selected from the group consisting of ammonia and ammonium salts, and a nitrification suppressing compound having the formula

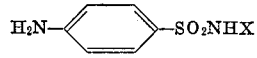

wherein X represents a member selected from the group consisting of hydrogen,

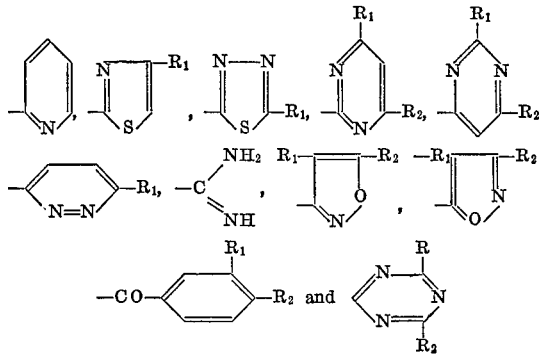

and each of $R_1$ and $R_2$ in X is a member selected from the group consisting of hydrogen, chlorine, bromine, methyl and methoxy, said compound being present in a concentration of at least 0.5 percent by weight based on the weight of the reduced nitrogen in the reduced nitrogen fertilizer.

10. A fertilizer composition according to claim 9 wherein said compound is 2-sulfanilamidothiazole.

References Cited

UNITED STATES PATENTS

| | | | |
|---|---|---|---|
| 2,238,973 | 4/1941 | Climenko | 260—397.7 XR |
| 2,259,222 | 10/1941 | Ewins et al. | 260—239.8 |
| 2,430,094 | 11/1947 | Wuest et al. | 260—239.9 |
| 3,011,885 | 12/1961 | Goring | 71—1 |
| 3,235,558 | 2/1966 | Harrison | 71—1 XR |
| 3,284,188 | 11/1966 | Amagasa et al. | 71—1 XR |

FOREIGN PATENTS 798,463  7/1958  Great Britain.

OTHER REFERENCES

Life Magazine, Jan. 19, 1948, vol. 24, No. 3, pp. 51, 52, 54.

Bulletin 498, Connecticut Agricultural Experiment Station, New Haven, July 1946, Dutch Elm Disease and its Chemotherapy, pp. 44 and 45.

S. LEON BASHORE, Primary Examiner

B. H. LEVENSON, Assistant Examiner

U.S. Cl. X.R.

71—61, 103